J. B. Kingham.
Nail Cutting Mach.
No. 3,353. Reissued Mar. 30, 1869.
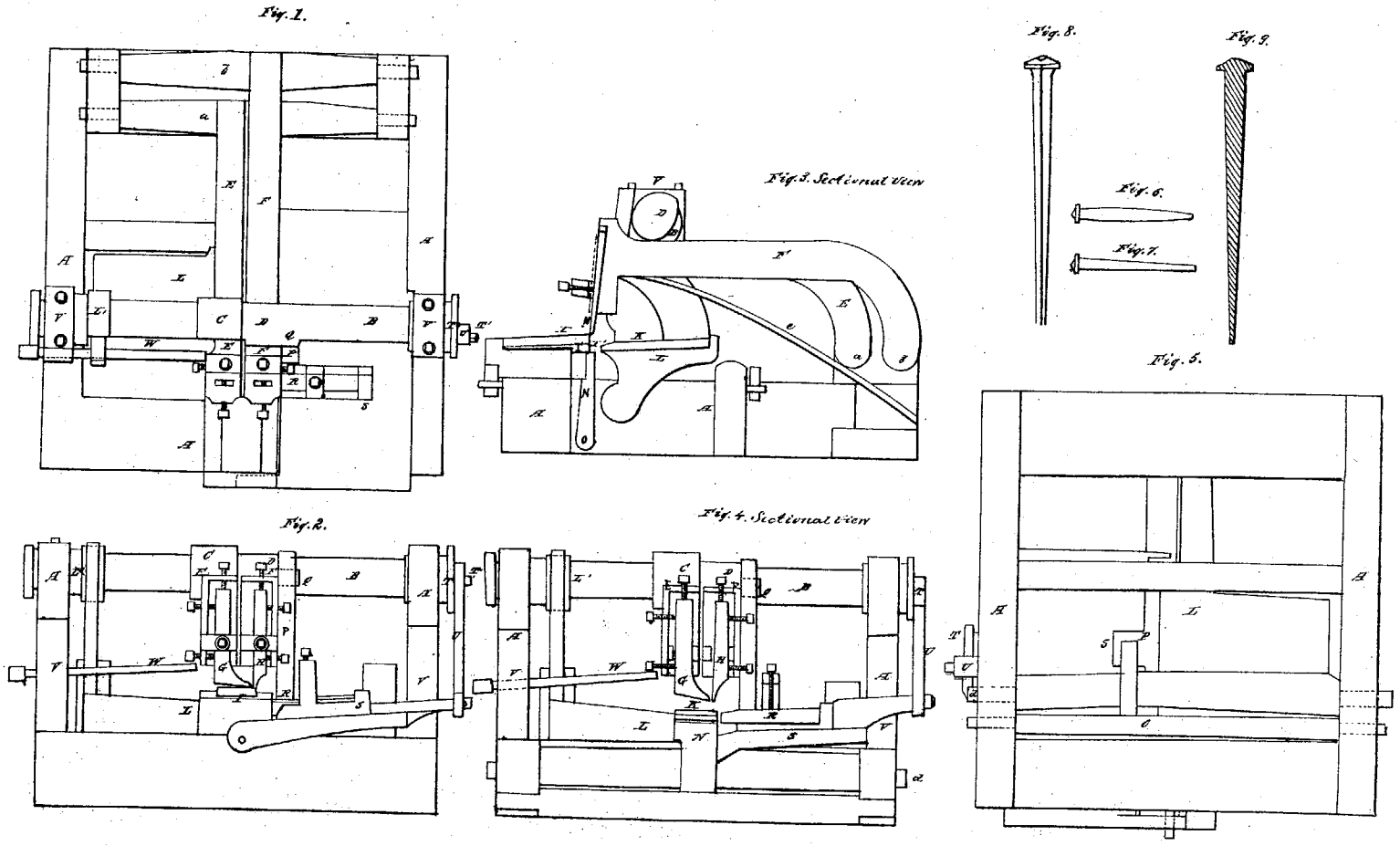
N. PETERS, PHOTO-LITHOGRAPHER, WASHINGTON, D. C.

UNITED STATES PATENT OFFICE.

JACOB B. KINGHAM, OF DORCHESTER, MASSACHUSETTS.

IMPROVEMENT IN NAIL-CUTTING MACHINES.

Specification forming part of Letters Patent No. 44,637 dated October 11, 1864; Reissue No. 3,353, dated March 30, 1869.

*To all whom it may concern:*

Be it known that I, JACOB B. KINGHAM, of Dorchester, in the county of Norfolk and State of Massachusetts, have invented certain new and useful Improvements in Nail-Cutting Machines; and I do hereby declare the following to be a full and exact description thereof, reference being had to the accompanying drawings, and to the letters of reference marked thereon.

To enable others skilled in the art to make and use my invention, I will proceed to describe its nature, construction, and operation.

The nature of my invention consists in improvements in the arrangements of the gripping-dies of a nail-machine, so that the nail-blank, after being cut from the plate, is held firmly on all sides while it is being headed, thus preserving the symmetry of the nail, or, in fact, improving it, the shank being made pyramidal in form; also in the arrangement and adjustment of the lower die, that it may swing back and forth under one of the lateral dies for the purpose of releasing the nail after being headed.

In the drawings, Figure 1 is a plan of my nail-machine. Fig. 2 is a front elevation. Fig. 3 is a longitudinal vertical section. Fig. 4 is transverse vertical section through the header. Fig. 5 is a plan representing the under side of the machine. Figs. 6 and 7 represent front and side elevations of an ordinary machine-made boat-nail. Figs. 8 and 9 represent perspective and sectional views of a nail made by my improved machine.

I first construct a strong frame of suitable material, (represented in the drawings by A,) and to this frame I attach the working parts of the machine. The main shaft B, Figs. 1, 2, 3, and 4, has affixed to it the cams C D, which, acting through the levers E F, Figs. 1 and 3, operate the movable cutters G H. I also attach to the main shaft the cam L′, Figs. 1, 2, and 4, which serves to operate the lever L, Figs. 1 and 3, and through it the lateral gripping-die K, Fig. 3.

T is a crank-disk attached to the main shaft B, which, operating through the crank-pin T′ and link U, operates the header R, Fig. 4.

Q, Figs. 1 and 2, is a cam, attached to the main shaft B, which, acting through the lever P and shaft O, vibrates the lower die, N. (See Figs. 2, 5, and 3.)

The strut W acts as an auxiliary support to resist the lateral pressure which would be exerted by the header R against the cutting-jaws.

In the operation of the machine the two cutters G H descend together and cut the blank from the nail-plate in precisely the same manner that the ordinary "Blanchard Nail-Tool" acts, after which the nail-blank is seized vertically by the cutter G, which now becomes a gripper, and the lower gripper, N, while at the same time it is seized laterally by the grippers K and I′, Fig. 3, in which condition—that is, being pressed upon its four sides with an even pressure, which preserves its semmetry and gives it a more complete pyramidal form—its head is struck up by the action of the header R. The four dies or grippers G, K, I′, and N are so ground and adjusted in relation to each other that they grip the nail upon its four sides, and compressing it slightly, tend to smooth its sides and to give it a pyramidal form.

From the above description it will be seen that the peculiarity of my invention consists in the method of gripping the nail-blank while the head is being formed. The advantages of my method being that I preserve the symmetry of the nail and improve it by giving it a more marked pyramidal form—that is, it diminishes gradually from the head to the point, as represented in Figs. 8 and 9, and when driven the part nearest the head will fill completely the hole made by the part nearer the point, which an ordinary cut nail will not do, and thus prevent leaks which otherwise occur.

Having thus described my invention, I will now proceed to set forth my claim.

What I claim as my invention, and desire to secure by Letters Patent, is—

1. Combining and arranging the gripping-dies G, K, I′, and N in the manner substantially as described, and for the purpose set forth.

2. Combining with the pivoted die N and stationary die I′ mechanism for vibrating said die N in the manner described, so that when the nail is freed from pressure the said die N will be forced under the die I′, Fig. 3, and allow the nail to drop out of the machine, as specified.

JACOB B. KINGHAM.

Witnesses:

FRANK G. PARKER,

A. HUN BERRY.